United States Patent [19]

Bauer

[11] 4,313,271
[45] Feb. 2, 1982

[54] ANIMAL MARKER FOR PREVENTING MILK CONTAMINATION

[76] Inventor: LeRoy Bauer, Rte. 2, Box 54, Shakopee, Minn. 55379

[21] Appl. No.: 179,179

[22] Filed: Aug. 18, 1980

[51] Int. Cl.³ .......................... G09F 3/00; A01K 11/00
[52] U.S. Cl. ......................................... 40/304; 119/126
[58] Field of Search ..................... 119/14.02, 105, 126, 119/146; 40/300, 304; 128/330, 316

[56] References Cited

U.S. PATENT DOCUMENTS

| 747,552 | 12/1903 | Jacobson | 119/126 |
| 1,089,508 | 3/1914 | Smith | 119/105 |
| 1,466,229 | 8/1923 | Johnson | 119/105 |

FOREIGN PATENT DOCUMENTS 2034045  1/1972  Fed. Rep. of Germany ...... 119/126

Primary Examiner—Hugh R. Chamblee

[57] ABSTRACT

A system is provided for preventing the contamination of milk. First, a milk contaminating condition is identified in dairy cattle or other milk producing animals. The condition typically results from the animal being treated with an antibiotic. A manually attachable contamination indicating marker is provided for the animal. The marker is secured in the vicinity of the animal's udder and is positioned so that milking cannot be conducted without the hands coming into close proximity to the marker. The marker is maintained on the animal until the milk again becomes wholesome viz. to the end of the withdrawal period for the particular antibiotic that is being used or other period required for decontamination of the milk. The marker has a label bearing surface with a written message that serves as a reminder to segregate or discard the milk and a fastener for securing the marker to the animal in close proximity to the udder and preferably immediately laterally thereof.

5 Claims, 5 Drawing Figures

U.S. Patent      Feb. 2, 1982      4,313,271
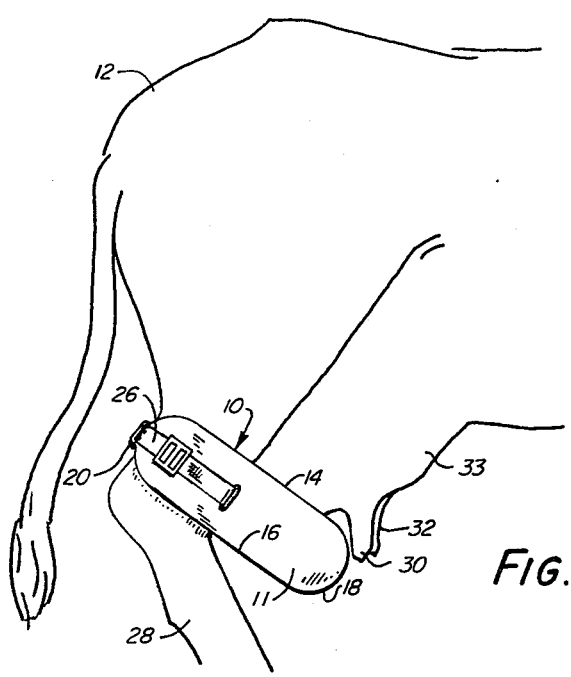
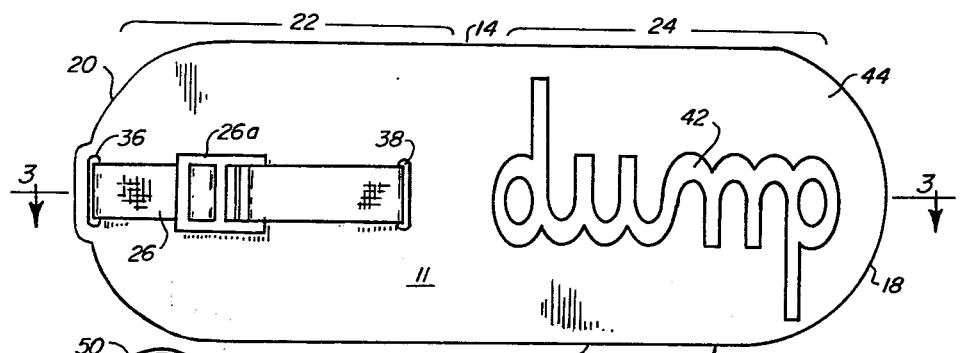
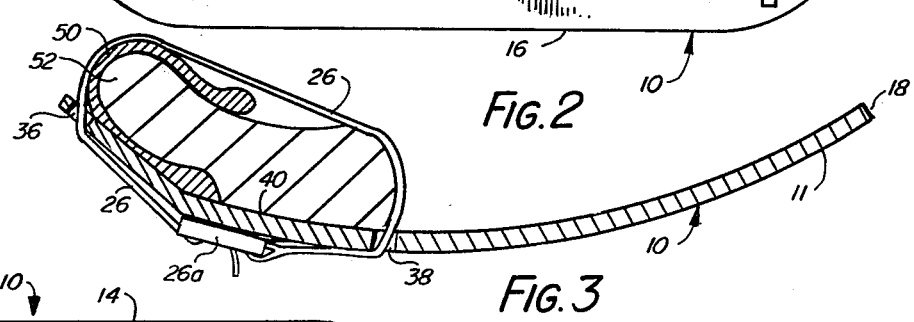
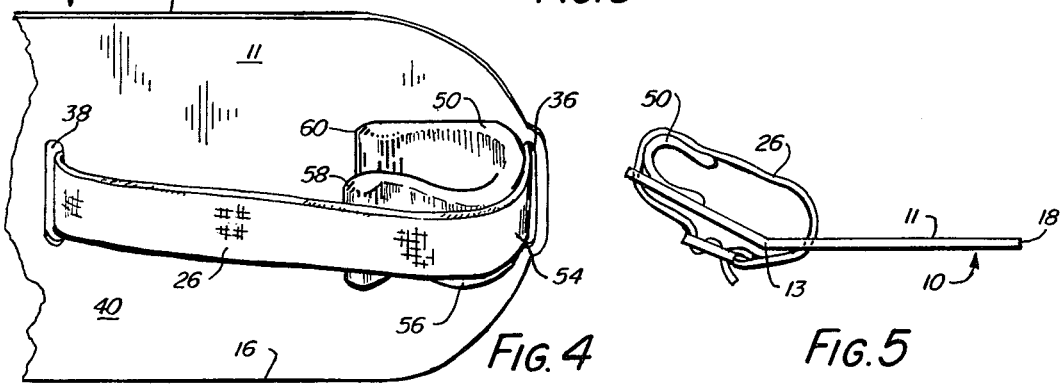
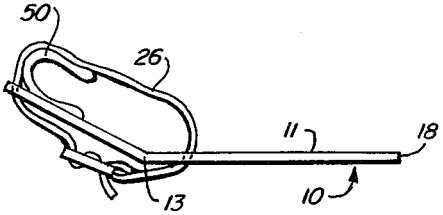

ANIMAL MARKER FOR PREVENTING MILK CONTAMINATION

FIELD OF THE INVENTION

The present invention relates to milk production and more particularly to the problem of preventing milk contamination.

THE PRIOR ART

The contamination of milk by antibiotics in the bloodstream of the cow or from other causes is a serious problem. It has been recognized for many years that it is essential to prevent antibiotic contaminated milk from being marketed. Should contaminated milk be consumed, it is possible for a person drinking the milk to have a harmful allergic reaction. Even a small amount of contaminated milk can contaminate all the milk in a large bulk tank. This is expensive and wasteful. To prevent contamination, milk in each bulk tank is thoroughly tested. To identify the source of the milk responsible for the contamination, a small sample from each farm is saved for subsequent testing. Testing in recent months has become even more stringent than in the past. For example, in Minnesota, tests conducted under State regulations can detect contamination e.g. by penicillin in amounts which are only a small fraction of that which was detectable previously. Contributing to the problem is the fact that to keep the cow healthy it must be milked regularly during the period of antiobiotic treatment and during the withdrawal period.

Previously informal measures have been taken to identify cows and other farm animals for a variety of conditions, e.g. animals that are sick or require a special diet. These methods include marking with chalk, paint, adhesive tape applied to the tail or a strap applied to the ankle. Some of the most important shortcomings in prior methods of identifying sick animals are as follows. The marking means is often not easily attached or removed after use. It is often ambiguous as to its meaning so that another person milking the animal may not know what it signifies. In the course of developing the present invention it was found that it is easy for a marker to shift, become damaged or fall off. In summary, prior markers are not reliable in making it unlikely that contaminated milk will enter the milk supply while at the same time allowing regular milking.

Someof the reasons recognized by dairymen that causes antibiotics to gain entrance to the market are the failure to identify a treated animal or the use of milk from three untreated quarters when only one quarter has been treated, milking by someone other then the person who treats the cow, failure to read antibiotic label instructions concerning the number of hours necessary to withhold milk following the last treatment, drug overdoses requiring greater withholding times, or failure to milk a treated cow thereby preventing fast clear out of contaminated milk. It is important to recognize that different drugs require different withholding periods. For example, sulfamethazine and thiabendazole require 96 hours of withholding after the last treatment whereas erythromycin (300 mg) requires only 36 hours if used as an intermammary infusion for mastitis in lactating cows and both ampicillin and socium cloxacillin require 48 hours of withholding.

OBJECTS

The main objects of the invention are to provide a system for preventing milk contamination and the marker for this purpose in which (a) marking can be easily accomplished and the marker easily removed following the withholding perid, (b) the meaning of the marker is not ambiguous, (c) the marker will now shift, become damaged, move about or fall off, (d) the marker reliably reminds the person doing milking to segregate the milk that is removed, (e) another object is to find a way to locate a marker having the above capabilities so that milking cannot be conducted without having hands come into close proximity with the marker i.e. the marker itself makes it inconvenient to milk the cow, (f) the provision of a marker of durable construction, (g) the provision of a written reminder supported upon the marker reminding one to discard, segregate or dump the milk, and (h) a provision that allows the same marker to be used on either the right or left side of the animal.

SUMMARY OF THE INVENTION

A system is provided for preventing the contamination of milk which comprises first identifying a milk contaminating condition in the animal. A manually attachable contamination indicating marker is provided. The marker is secured in the vicinity of the animal's udder and is positioned so that milking cannot be conducted without the hands coming into close proximity to the marker during milking. When the condition results from antibiotic treatment, the marker is maintained on the animal during the treatment period and during withdrawal period for the particular antibiotic that is being used. In short, marking is continued during the period required for decontamination of the milk. The animal is milked during the period in which the marker is maintained in position and the milk thus obtained as segregated from milk obtained from other animals during the withdrawl period. The marker has a body portion with a label bearing surface including a written message that serves as a reminder to segregate or discard the milk. A fastener is provided for securing the marker to the cow or other animal in close proximity to the udder and preferably immediately laterally thereof.

THE FIGURES

FIG. 1 is a perspective view of one embodiment of the invention as it appears in use, FIG. 2 is a side elevational view of one form of the marker in accordance with the invention on a larger scale, FIG. 3 is a horizontal sectional view taken on line 3—3 of FIG. 2, FIG. 4 is a partial perspective view of the reverse side of the marker shown in FIG. 2, FIG. 5 is a top view of a modified form of marker.

DETAILED DESCRIPTION

While the invention is described in connection with dairy cattle it should be understood that the present method can be used with all animals which produce milk in commercial quantities. First, the milk contaminating condition is identified. This normally involves treating the animal with antibiotics for an infection or other illness. However, the invention is applicable to conditions other than the treatment with antibiotics which render the milk unsuitable for consumption. In any event the condition that contaminates the milk is first identified. The marker which will be described below is then attached to the animal in the vicinity of the udder and is secured in a position that makes it inconvenient to milk the animal. Specifically, the marker is positioned on the animal so that the hands of the person doing the milking will come into close proximity to the marker during the milking operation. The marker is maintained on the animal during the entire treatment period and during the withholding period i.e. the period during which the milk must be disposed of following treatment with antibiotics. During this period the milk is segregated and is normally disposed of.

Refer particularly to FIGS. 1–4 which illustrate a typical marker embodying the invention.

As seen in the Figures, the marker 10 is secured during use to the body of a cow. The marker has a body section 11 formed from sheet material and is elongated from front to rear. It includes straight bottom and top edges 14 and 16 and curved front and rear edges 18 and 20 that provide a smooth peripheral edge without sharp corners which might jab into the animal. In one typical application the marker 10 is about 13½ inches long and about 5 inches wide. It consists of 0.125 inch thick polypropylene plastic. Other materials can be employed if desired and the specific shape illustrated is not essential. The generally elongated overall shape is preferred as will be described more fully below although it is not utterly essential. The marker 10 can be thought of as being divided into two halves; a rear half 22 and a forward half 24. The rear half 22 is provided with a fastener or attachment means 26 such as a horizontally extending belt for securing the marker to the leg 28 of the cow. The forward half 24 extends anteriorly from the leg and laterally of the udder. It preferably at least partially obscures the teats, two of which are shown at 30 and 32 and two of which are completely hidden. It can be seen that the marker 10 is in close proximity to the udder. Specifically, it is secured to the leg 28 in such a position that milking is made somewhat inconvenient because of the presence of the marker. More specifically, the hands of the person doing the milking will come into close proximity to the marker during the milking operation. Accordingly, milking cannot be done without the person becoming aware of the need for segregating the milk during the time the marker is in place e.g. during the treatment period and the subsequent withholding period for the drug in question. The term "withholding period" as used herein is meant the period during which milk cannot be safely used following drug treatment as well as period of sickness or other period during which the milk cannot be used.

The belt 26 can be formed from cloth such as nylon or other suitable strapping material and can be secured to the marker 10 for example by runnint it through longitudinally spaced apart vertically extending slots 36 and 38 both of which are located on the horizontal midline of the marker 10 and both of which are located in the rearward section 22 of the marker so that the leg 28 will also be positioned adjacent the rearward inner surface 40 of the marker. The belt 26 thus serves as a leg holding member for securing the clasp 50 and marker 10 to the leg 28 of the animal. The forward or leading portion 24 of the marker thus extends anteriorly from the leg 28 to the position shown partially covering the udder 33. It will thus be understood that by having a rearward section 22 secured to the leg and a forward anteriorly projection section located laterally of the udder the objective is met of having the marker positioned as described above, that is to say, positioned so that the hands of the person conducting the milking will have to come in close proximity with the marker. The forward portion 24 can be provided, if desired, with a printed warning or label 42 such as the word "dump" which when written as shown will read the same both right side up and upside down so that the marker can be used on either the right or left rear leg of the cow. The use of the warning label 42 while not essential, is desirable since it will act as a further reminder that the milk should be dumped while the marker is in place. The outside 44 of the marker thus functions as a label bearing surface.

As shown in FIG. 3, the marker 10 is curved or arcuate in shape as seen from above. This causes the forward anteriorly projecting portion 24 of the marker to extend medially of the animal helping to assure that it will lie close to the body and not be likely to become bent, damaged, broken or catch on things as the animal walks around the farm yard.

Refer now to FIGS. 3 and 4 which illustrate a clasp or hook 50 at the rearward end of the marker that opens forwardly to engage the rearward edge 52 of the cow's leg. The clasp 50 is resilient and is conveniently formed of plastic integral with the marker 10 although it can if desired be formed as a separate part and bonded or otherwise secured to the marker body for example, with rivets (not shown). In the embodiment illustrated, the clasp 50 is integral with the body portion of the marker 10. The edges of the clasp are rounded along the top edge 54 the bottom edge 56 as well as the forward edges 58 and 60 making it possible to slide the clasp easily over the rearward edge 52 of the leg 28 without injuring the skin. The belt 26 extends as shown at 54 around the inner aspect of the clasp 58. When the marker 10 is used, clasp 50 is slid forwardly over the rear edge of the cow's leg and the belt 26 is secured tightly by means of a buckle 26a.

While the marker 10 is shown as elongated and include forward and rearward portions, it may if desired have other shapes such as circular, square or rectangular and, as such, is still in close proximity to the cow's udder.

Refer now to FIG. 5 which illustrates a modified form of the invention wherein the same numerals refer to corresponding parts already described in the other Figures. As can be seen, the marker 10 includes a portion 11 formed from sheet material as already described. However, in this instance the body 11 is not arcuate as seen from the top but instead includes a vertical bend 13 which brings the forward edge 18 medially of the animal i.e. closer to the cow's body. The band 13 is provided for the same purpose, namely, to prevent the forward edge 18 from projecting toward one side where it could be damaged. In all other respects the embodiment of FIG. 5 is the same as that illustrated in FIGS. 1–4.

The use of the marker has already been described above. In most situations the dairyman is simply instructed to use the marker at the time the cow is treated with an antibiotic. It is preferred that at the same time the treatment is administered, the marker 10 is strapped on the leg. It is left in place until the milk is known to be good. Treatment is usually carried out for from 3 to 6 milkings. The withholding period must also elapse before the milk can be used. In the meantime while the marker 10 is in place milking can be carried out as usual.

What is claimed is:

1. A marker to be used in marking milk producing animals to reduce the likelihood of contaminated milk from reaching the market, said marker comprising a marker body having a securing means for attaching the marker to the body of the animal in a position in close proximity to the animal's udder, said marker is elongated and includes a rearward section having said securing means located thereon and a forward anteriorly projecting section which extends toward the front of the animal from the rearward section and is located in close proximity to the animal's udder, the udder being positioned generally medially thereof when the marker is secured to the animal's leg.

2. The marker of claim 1 wherein the marker includes a leg engaging clasp and a leg holding member for retaining the clasp and marker on the animal's leg in proximity to the animal's udder.

3. A marker to be used in marking milk producing animals, said marker comprising a marker body, securing means for attaching the marker to the body of the animal in a position in close proximity to the animal's udder, said marker includes a rear section having said securing means located thereon and a forward anteriorly projecting section which extends toward the front of the animal from the rearward section and is located in close proximity to the animal's udder, the marker is composed of a sheet of material having an inner surface facing the body of the animal and an outer surface on the opposite side thereof, said outer surface comprising a label bearing surface and indicia on said outer surface to serve as a warning to remind one to discard milk obtained during milking while the marker is in place.

4. The marker of claim 3 wherein the marker comprises a body formed from sheet material having an arcuate shape as seen from above, a clasp is positioned at the rear thereof, a forward portion extends anteriorly therefrom and is curved medially with respect to the body of the animal.

5. The marker of claim 3 wherein the marker is formed from a sheet of material and said marker has a vertical bend therein, the bend being formed in a direction adapted to bring the forward most portion of the marker medially with respect to the body of the animal.

* * * * *